Figure 1:
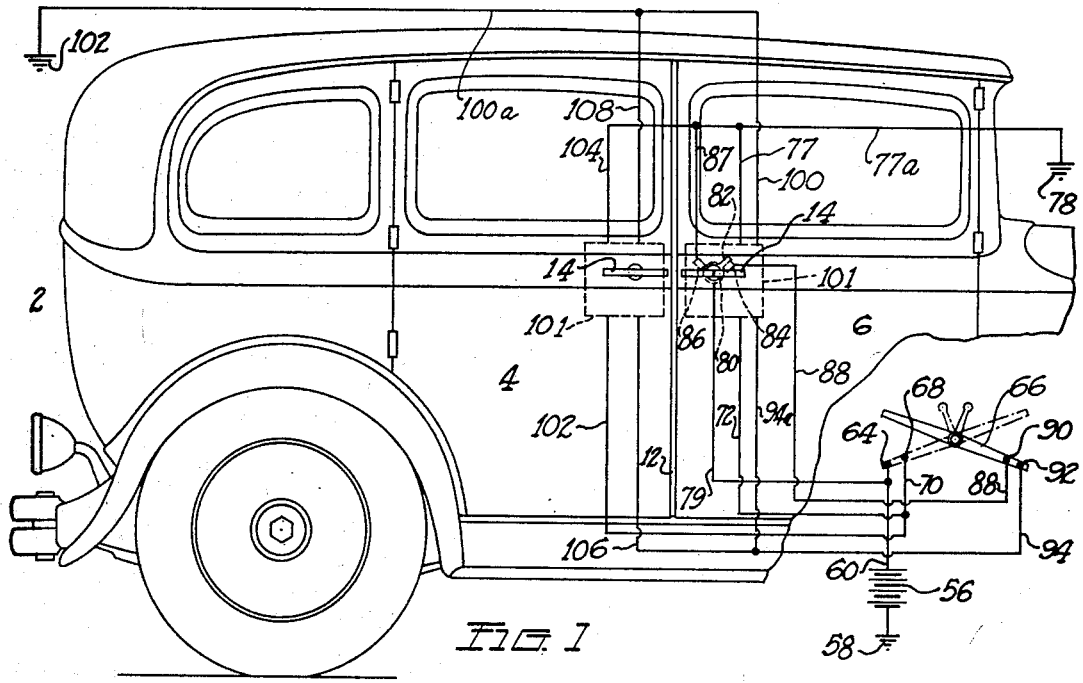

Jan. 28, 1936.   C. H. VINCENT   2,028,852
DOOR LOCKING MEANS
Filed March 30, 1934

Inventor
CHARLES H. VINCENT
By Milton Tibbetts
Attorney

Patented Jan. 28, 1936

2,028,852

UNITED STATES PATENT OFFICE 2,028,852

DOOR LOCKING MEANS

Charles H. Vincent, Utica, Mich., assignor to Packard Motor Car Company, Detroit, Mich., a corporation of Michigan Application March 30, 1934, Serial No. 718,142

11 Claims. (Cl. 70—50)

This invention relates to locking mechanism for locking the doors of motor vehicles.

The invention relates particularly to mechanisms for locking simultaneously a plurality of doors. The invention, however, is not limited to such a locking mechanism but certain features thereof may be embodied in mechanisms for locking only one of the doors.

The invention is illustrated in this application as embodied in a mechanism in which the locking of the doors is electrically effected and controlled. The invention, however, is not limited to a construction in which the locking and unlocking is produced by an electrical mechanism but certain features thereof may be embodied in a locking mechanism in which the locking and unlocking is produced by mechanically controlled and operated mechanism.

In the more common or conventional motor vehicle constructions, all of the doors except one are locked and unlocked individually by devices arranged to be operated manually from the inside of the vehicle and only from the inside thereof. Door locking mechanisms have been devised for motor vehicles in which all of the doors except one are locked and unlocked simultaneously by the manual operation of a lock controlling device located inside of the vehicle. In these cases, the remaining door has been arranged to be locked and unlocked from the outside of the vehicle by means of a key operated lock. Such locks are often so constructed that the lock mechanism may be operated from the inside of the vehicle to unlock the door. With a motor vehicle equipped with locking devices for one or more of the doors operable from inside the vehicle to unlock the doors after the vehicle has been locked from the outside thereof, it is possible for a thief or other unauthorized person to pry open one of the windows of the vehicle when locked from the outside and then reach in and operate the locking device of one of the doors to unlock the same allowing him to enter the body of the vehicle.

One object of the present invention is to improve the construction and mode of operation of locking mechanisms for locking the doors of motor vehicles and to produce a locking mechanism which will avoid the disadvantage above referred to in prior locking mechanisms.

Another object of the invention is to produce an improved locking mechanism for simultaneously locking two or more doors of a motor vehicle.

A still further object of the invention is to produce an improved locking mechanism for motor vehicles by which all of the doors may be locked simultaneously either from the inside or from the outside of the vehicle.

With the above and other objects in view, the invention consists in a locking mechanism embodying the novel and improved features hereinafter described and particularly pointed out in the claims, the advantages of which will be readily understood by those skilled in the art.

The invention will be clearly understood from the accompanying drawing illustrating the invention in its preferred form and the following detailed description of the construction therein shown.

Figure 2:
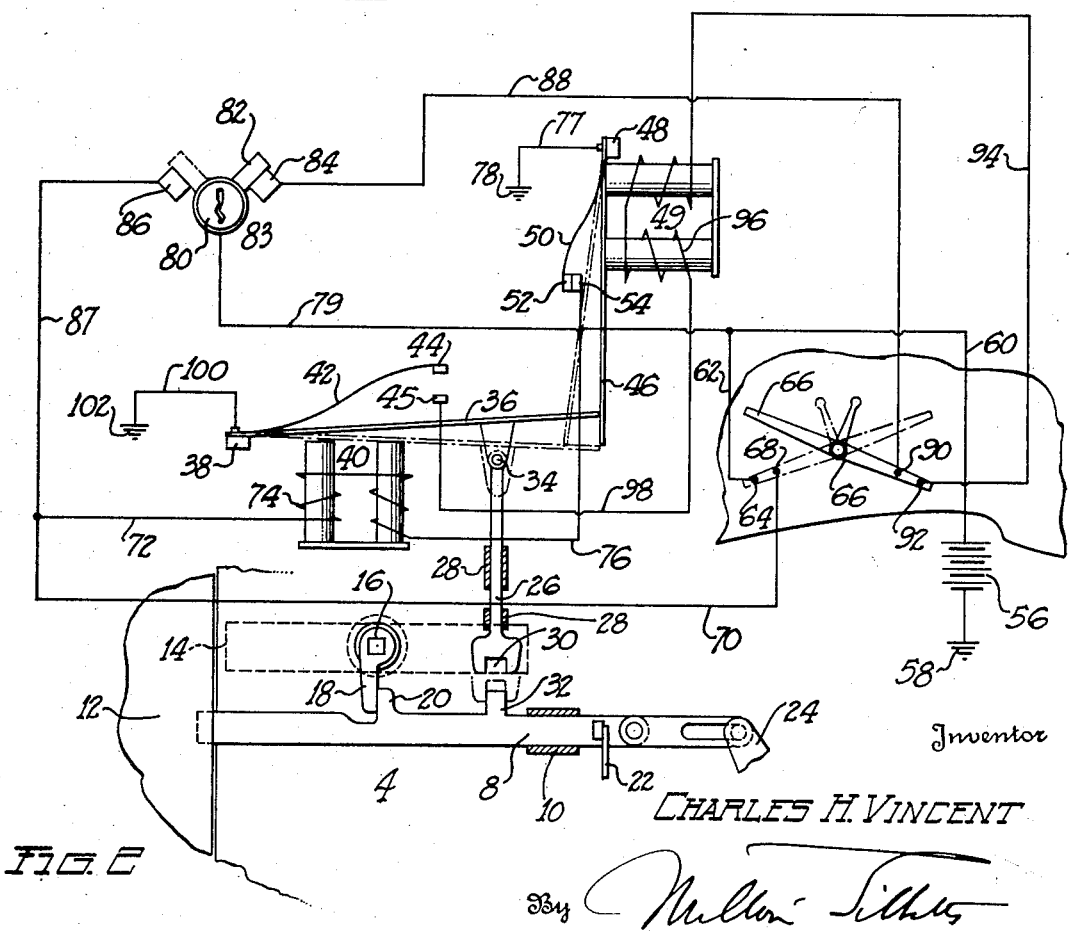

In the drawing, Fig. 1 is a view illustrating in side elevation a portion of the body of a motor vehicle and showing diagrammatically the manner in which the present locking mechanism is applied to two of the doors thereof and;

Fig. 2 is a view illustrating certain parts of the locking mechanism for one of the doors and showing diagrammatically the circuit connections for controlling said locking mechanism;

In the form of the invention illustrated in the drawing, the invention is applied to the body of a motor vehicle indicated as a whole at 2. This body is of the usual closed type having four doors of which the two on the right hand side of the vehicle are shown in Fig. 1 and are indicated respectively at 4 and 6.

A locking mechanism is applied to each of the several doors, these locking mechanisms preferably having substantially the same construction. Fig. 2 shows a construction which may be applied to each of the doors. Said construction comprises a latch or locking bolt 8 mounted on the door to slide longitudinally in suitable guides, one of which is indicated at 10. The end of the locking bolt projecting beyond the door is arranged to engage a catch on a striker plate (not shown). The striker plate is mounted upon the pillar 12 constituting part of the door frame.

The locking bolt 8 is retracted by means of a handle 14 located outside of the door. This handle is secured to a shaft 16 rotatably supported in the door on which shaft is mounted to rotate with the shaft an arm 18 arranged to engage a projection 20 on the locking bolt. The locking bolt is provided with the usual spring 22 for advancing the same into locking position and is retracted from the inside of the vehicle by means of the usual remote control lever 24.

The locking mechanism for securing the bolt 8 in forward or locking position comprises a longitudinally movable bar 26 mounted to slide in guides 28 secured to the door and having at its lower end a locking recess 30 arranged to receive a projection 32 on the locking bolt when the bar 26 is lowered. The upper end of the bar is pivotally connected at 34 to a lug attached to a spring plate 36 rigidly fixed at its left hand end to a suitable stationary support 38. The spring plate 36 normally assumes the position shown in full lines in Fig. 2 and is moved into the position shown in dot-and-dash lines in said figure to carry the locking bar 26 into locking position. The spring plate 36 is moved from full line or unlocking position to dot-and-dash line or locking position by means of an electro-magnet 40.

The spring plate 36, when moved into locking position, is held in this position by means of a similar spring plate 46 rigidly secured at its upper end to a suitable fixed support 48. The spring plate 46 normally assumes the position shown in dot-and-dash lines in Fig. 2. When the spring plate 36 is in unlocking position, the spring plate 46 is held by the spring plate 36 in the position shown in full lines and yieldingly engages the end of the spring plate 36. As the spring plate 36 is moved into locking position, the end thereof is carried past the end of the spring plate 46 thereby releasing the plate 46 and the latter then springs to the left into dot-and-dash line position to hold the spring plate 36 in locking position. In a similar manner, when the spring plate 46 is moved from locking to unlocking position, the end of said spring plate is carried past the spring plate 36 and the latter springs upwardly into unlocking position in which it holds the spring plate 46 in unlocking position.

The spring plate arm 46 is moved from locking to unlocking position by means of an electro-magnet 49.

Attached to the left hand end of the spring plate 36 is a flexible spring arm 42 which carries at its free end an electrical contact 44 arranged to engage a corresponding contact 45. When the spring plate 36 is in full line position, the contact 44 is disengaged from the contact 45 as shown but is carried into engagement with the latter contact as the spring plate is swung from full line to dot-and-dash line position.

Attached to the spring plate 46 is a flexible spring arm 50 upon which is mounted an electrical contact 52 arranged to engage a corresponding contact 54. When the spring plate 46 is in dot-and-dash line position the contacts 52 and 54 are disengaged. As the spring plate 46 is swung into full line position, the contact 52 is engaged with the contact 54.

Fig. 2 shows the electrical connections for the locking mechanism for one of the doors. The current is supplied from a battery indicated at 56 which has a ground connection indicated at 58 on one side thereof. The other side of the battery is connected by means of conductors 60 and 62 with the terminal 64 of a two-way switch 66. Another terminal 68 of this switch is connected by conductors 70 and 72 with the coil 74 of the electro-magnet 40 which in turn are connected by a conductor 76 with the contact 54. The spring arm 50 is connected by a conductor 77 with a ground 78.

The conductor 60 is connected by a conductor 79 with one contact 82 of a switch. This switch contact is secured to the rotatable cylinder 80 of a lock operated by the usual key. The said contact is arranged to engage a contact 84 when the lock cylinder is in unlocked position and to engage a contact 86 when the cylinder is in locked position. The contact 84 is connected by a conductor 88 with a third terminal 90 of the two-way switch 66. A fourth terminal 92 of the latter switch is connected by a conductor 94 with the coils 96 of the electro-magnet 49. These coils in turn are connected by a conductor 98 with the switch contact 45. The flexible arm 42 is connected by a conductor 100 with a ground 102.

The switch 66 is located where it is readily accessible from within the vehicle when the vehicle is closed and is preferably located at a point within the body where it may be conveniently reached by the driver. The lock cylinder 80 is located where it is accessible from outside the vehicle when the vehicle is closed and preferably is located at a point on one of the doors where the usual lock cylinder is placed.

With the electrical locking system above described, starting with the parts in unlocked positions as shown in Fig. 2, when the two-way switch 66 is moved from the full line into the dot-and-dash line position shown in said figure, the electro-magnet 40 is energized to swing the spring plate 36 downwardly and thereby to move the locking bar 26 downwardly into locking position. The circuit for the electro-magnet may be traced as follows: The current passes from the battery through the conductors 60 and 62 to the terminal 64 of the two-way switch and thence across the switch to the terminal 68 thereof. The current then passes from said terminal through the conductors 70 and 72 to the coils 74 of the electro-magnet 40 and through the conductor 76 to the switch 52—54 which is then closed. From this point, the current passes through the flexible arm 50 of the latter switch and the conductor 77 to the ground 78.

The movement of the spring arm 36 engages the switch contact 44 with the switch contact 45. As the movement of the spring arm 36 downwardly into locking position carries the same beyond the end of the spring arm 46, the latter arm springs laterally into the dot-and-dash line position, thereby disengaging the switch contacts 52 and 54. The circuit for the electro-magnet 40 therefore is made only long enough to move the locking bar into locking position so that there is no waste of current.

When the lock cylinder switch is in locking position with the contact 82 in engagement with the contact 86, the electro-magnet 40 is energized to throw the locking bar 26 into locking position regardless of the position of the two-way switch 66. The circuit for the electro-magnet 40, when the lock cylinder switch is in locking position may be traced as follows: From the battery 56 the current passes through the conductors 60 and 79 through the switch contact 82 and thence through contact 86 and conductors 87 to the conductor 72. From this point, the current follows the same circuit to the ground 78 as above described.

When the two-way switch 66 and the lock cylinder switch are both in unlocking position, the electro-magnet 49 is energized to move the spring plate 46 from locking to unlocking position, thereby releasing the spring plate 36 and said plate then springs upwardly into unlocking position. The circuit for the electro-magnet 49 may be traced as follows: From the battery 56 the current passes through the conductors 60 and 79 to the switch contact 82 and thence through switch contact 84 and conductor 88 to the contact 90 of the two-way switch. Thence the current passes across the switch and through the conductor 94 to the coils 96 of the electro-magnet and thence through the conductor 98 to the switch 44—45 which is then closed. The current then passes through the flexible arm 42 of said switch and conductor 100 to the ground 102. As the spring plate 36 moves into unlocking position, the switch contact 44 is carried out of engagement with the contact 45 thereby breaking the circuit.

Fig. 1 of the drawing shows circuit connections which may be employed for the lock mechanisms of two of the doors of a motor vehicle. In this figure the lock bolts, locking bar, electromagnets, switches and certain other parts of the locking mechanism for each door are indicated as enclosed in a casing 101. The circuit connections for the lock for the front door are substantially the same as the connections shown in Fig. 2 with the following additions. The conductor 77 leading from the lock mechanism is connected with the ground 78 by means of conductor 77a. The conductor 94 is connected with the lock mechanism by means of a conductor 94a and the conductor 100, leading from the lock mechanism is connected with the ground 102 by means of a conductor 100a.

The conductor 70 is connected with the lock mechanism 101 for the rear door by means of a conductor 102 and leading from the said lock mechanism is a conductor 104 connected with the conductor 77a. The conductor 94 is connected with said lock mechanism 101 by means of a conductor 106 and leading from said lock mechanism is a conductor 108 connected with the conductor 100a.

Any number of lock mechanisms for the several doors of a motor vehicle may be connected up in a system in substantially the same manner as the two lock mechanisms shown in Fig. 1. Preferably the locks of all of the doors are connected in the system so as to be locked and unlocked simultaneously by the actuation of the switch 66 or by the actuation of the lock cylinder switch.

With the above construction, when the doors of the vehicle have been locked from the outside thereof, the lock cylinder switch must be thrown into unlocked position before any of the doors can be opened. A thief or other unauthorized person cannot therefore unlock the vehicle by prying open a window and manipulating the switch 66. The doors may all be locked and unlocked by a person within the vehicle by the actuation of the switch 66. After the doors are locked from the inside of the vehicle in this manner by the operation of the switch 66, a person within the vehicle cannot open one of the doors and leave the vehicle until said switch has been moved into unlocked position. If one or more of the doors has been opened and the switch 66 is thrown into locked position while the door is open, the locking bar 26 will lock the bolt 8 from movement and prevent the closing of the open door. These provisions prevent the vehicle from being left locked by the control switch 66 which would necessitate the prying open of a window or door in order to gain access to said switch from outside the vehicle. The present locking mechanism also prevents children or others within the vehicle from opening the doors by operating the usual control handles.

It will be noted that the lock mechanism may be operated to lock the doors by the throwing of the switch 66 into locking position when the lock cylinder switch is in unlocking position and that said mechanism may be operated to unlock the doors by the throwing of the switch 66 into unlocking position only when the lock cylinder switch is in unlocking position. In a similar manner, the lock mechanism may be operated to lock the doors by throwing the lock cylinder switch into locking position when the switch 66 is in unlocking position and said mechanism may be operated to unlock the doors by throwing the lock cylinder switch into unlocking position only when the switch 66 is in unlocking position.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A construction for motor vehicles comprising two or more doors, means for locking simultaneously said doors, means accessible only from inside the vehicle when the vehicle is closed for operating the locking means to lock and unlock the doors, means accessible from outside the vehicle when the vehicle is closed for operating the locking means to lock and unlock the doors, and mechanism to prevent the first means from being operated to unlock the doors when the second means is in locking position.

2. A construction for motor vehicles comprising a plurality of doors, locks for said doors, two independently operable means for actuating said locks to lock and unlock the doors simultaneously, and devices for preventing the unlocking of the doors by one of said means when the other means is in locking position.

3. A construction for motor vehicles comprising a plurality of doors, means operable only from inside a closed vehicle for locking and unlocking said doors, means operable from outside the closed vehicle for locking and unlocking said doors, and mechanism for rendering each of said means respectively inoperative to unlock the doors when the other means is in locking position.

4. A construction for motor vehicles comprising a door, electrically controlled locking mechanism for the door, a switch for causing the actuation of said locking mechanism to lock and unlock the door, a second switch for causing the actuation of said mechanism to lock and unlock the door, and means for preventing the unlocking of the door by the action of one of said switches when the other switch is in locking position.

5. A construction for motor vehicles comprising two or more doors, electrically controlled locks for said doors, a switch accessible only from inside the body of the vehicle when the vehicle is closed for controlling said locks, a switch arranged to be operated from outside the vehicle and normally operable only by authorized persons for controlling said locks, and means controlled by the latter switch for preventing the unlocking of the doors when said switch is in locking position.

6. A construction for motor vehicles comprising two or more doors, means operable only from inside a vehicle when the vehicle is closed for locking and unlocking said doors, means operable from outside the vehicle when the vehicle is closed for locking and unlocking said doors, and mechanism for preventing the unlocking of the doors by said first means when said second means is in locking position.

7. A construction for motor vehicles comprising a door, a locking device for said door operable from inside the vehicle, a second door, a locking device for the second door operable from outside the vehicle and means for preventing the unlocking of the first door from inside the vehicle when the second door has been locked from outside the vehicle.

8. A construction for motor vehicles comprising a plurality of doors, means for simultaneously locking said doors operable from the inside of the vehicle, another door, a locking device for said door operable from outside the vehicle and means for preventing the unlocking of said first doors from the inside of the vehicle when the last door has been locked from the outside of the vehicle.

9. A construction for motor vehicles comprising a door, a locking device for the door, an electromagnet for causing the actuation of the locking device to lock the door, a circuit for said magnet, an electromagnet for causing the actuation of the locking device to unlock the door, a circuit for said magnet, a switch in said first circuit controlled by said first magnet to break the circuit when the locking device is moved into locking position and controlled by the second magnet to close a break in said circuit when the locking device is moved into unlocking position and a switch in said second circuit controlled by said second magnet to break said circuit when the locking device is moved into unlocking position and controlled by said first magnet to close a break in the second circuit when the locking device is moved into locking position.

10. A construction for motor vehicles comprising a door, a locking device for the door, electrical mechanism for controlling the locking device including an unlocking circuit, a switch operable only from the inside of a vehicle when the vehicle is closed for controlling said circuit and a lock controlling device arranged to be operated from the outside of the vehicle when the vehicle is closed, said circuit having contacts relatively actuated to break the circuit when said lock controlling device is moved into locking position.

11. A construction for motor vehicles comprising a door, a locking device for the door, electrical mechanism for controlling the locking device including locking and unlocking circuits, a switch operable only from inside a vehicle when the vehicle is closed for controlling the locking device to lock and unlock the door and a second switch arranged to be operated from the outside of the vehicle when the vehicle is closed for controlling the locking device to lock and unlock the door and constructed to prevent, when in locking position, the closing of an unlocking circuit by the first switch.

CHARLES H. VINCENT.